June 30, 1931.   A. W. NICHOLSON   1,812,361
FEED VALVE FOR AIR BRAKE SYSTEMS
Filed Aug. 15, 1928
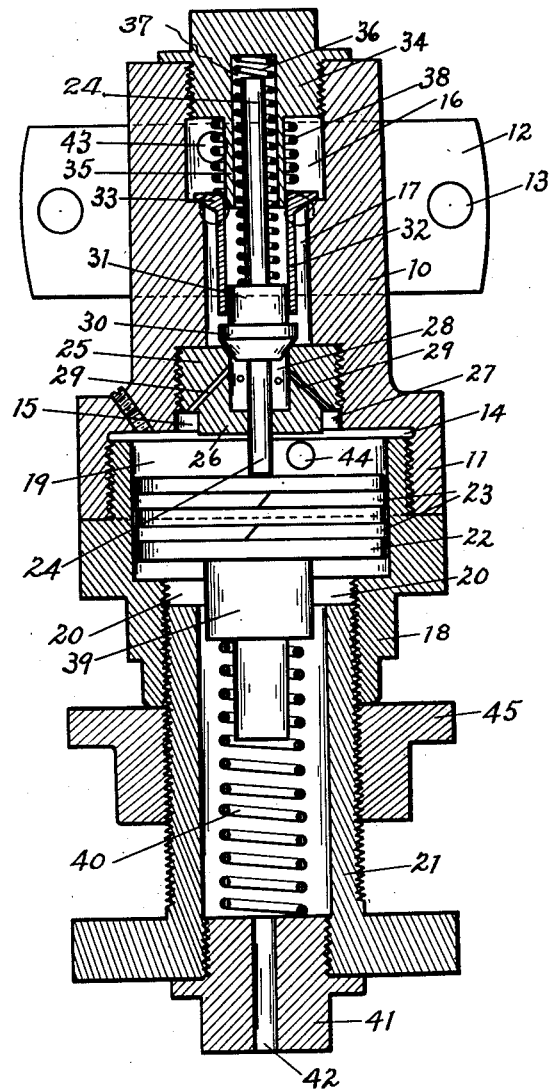
INVENTOR
Alexander W. Nicholson
by William B. Wharton
his attorney Patented June 30, 1931

1,812,361

UNITED STATES PATENT OFFICE

ALEXANDER W. NICHOLSON, OF DICKERSON RUN, PENNSYLVANIA

FEED VALVE FOR AIR BRAKE SYSTEMS

Application filed August 15, 1928. Serial No. 299,699.

This invention relates to a device for reducing the pressure of air, and automatically feeding it into the train line of an air brake system.

The function of feed valves in air brake systems is well known, and even though there are many devices of this nature, it has been found desirable to design a special feed valve, which may be used in conjunction with an automatic engineer's brake valve for controlling an air brake system which is equipped with automatic retaining valves, such as the retaining valve which is illustrated and described in applicant's Patent No. 1,548,163, dated August 4th, 1925. The particular structure of the present feed valve is desired in order to obtain a sensitive and accurate regulation of the pressure introduced into the train line. In my copending application Serial No. 299,852, filed August 15, 1928, which has become Patent No. 1,751,943, issued March 25th, 1930, the coordination existing between this feed valve and an automatic engineer's brake valve is illustrated and described.

The object of this invention is to provide an automatic feed valve, which may function in conjunction with an automatic engineer's brake valve to control the operation of an air brake system, particularly a system equipped with automatic retaining valves.

The accompanying drawing is a central vertical sectional view taken through the automatic feed valve of this invention.

In the present embodiment of the invention there is shown a valve having an upper body portion 10, enlarged at its bottom end as at 11, and provided with a securing plate or flange 12 having openings 13 so that the valve may be bolted securely into position upon an engineer's brake valve. This body has an opening extending from end to end thereof, the opening varying in size at different portions. At the lower end of the upper body 10 the opening 14 is of relatively large diameter while just above this part the opening is contracted to form a portion 15 of medium diameter, a similar portion 16 of medium diameter being formed at the top of the valve. Between the portions 15 and 16 the opening is of less diameter, forming a passage 17.

There is an intermediate body member 18 likewise having an opening therethrough, of which opening the upper portion 19 is the larger and the lower portion 20 is the smaller. The opening 14 in the upper body is internally threaded, and the upper end of said intermediate body 18 is reduced and threaded, in order that it may be screwed into the lower portion of the upper body. The portion 20 of the body 18 is likewise threaded, and into this threaded opening is screwed the upper portion of a lower body portion 21 which, as will be present explained, forms an adjusting nut for a certain spring.

In the opening 19 is positioned a piston 22, which is provided with rings 23 so as to cause the piston to fit air-tight in the cylinder formed by the opening 19. Extending upwardly from the piston 22 is a stem 24, which extends upward centrally of the opening in the upper body. Screwed into the portion 15 of the upper body opening is a plug 25 having a reduced lower end 26 so that a channel 27 is formed around this lower end, between said end and the wall of the opening 15. This plug has a recess 28 extending downwardly from its upper end, and the stem 24 passes through a suitable opening in the plug and extends centrally through this recess. Leading from the recess 28 to the channel 27 is a plurality of ports 29. The upper end of the recess is of inverted frusto-conical form so as to constitute a seat for a valve 30 which is mounted on the stem 24, and which has a reduced upper end 31 fitting within a sleeve 32 which extends upwardly through the opening 17. Sleeve 32 is provided at its upper end with an annular valve 33 seating on the upper edge of the opening 17.

Screwed into the top of the opening 16 is a cap or plug 34, which has a reduced lower end 35 fitting in the annular valve 33 and sleeve 32 so that the lower part of the opening 16 forms a chamber surrounding this end 35 below the body of the plug 34. Extending upwardly through the end 35 and into the body 34 is a recess 37. A spring 36 has its upper end seated in the upper end of this recess and surrounds the upper end of the stem 24, so that its lower end seats on top of the valve 31. A second spring 38 surrounds the plug end 35 and has its upper end bearing against the body of the plug 34 and its lower end on the annular valve 33. By means of these two springs the valves 30 and 33 are urged into seated position.

Extending downwardly from the piston 22 is a stem 39, the lower end of which is surrounded by the upper end of a spring 40, which rests against a shoulder formed on said stem. The lower end of this spring rests against a plug 41, which is screwed into the lower end of the body portion 21 and is provided with an air vent 42. A port 43 affords communication with a pressure supply tank, such as the main reservoir of an air brake system. Similarly, a port 44, leading from the opening or cylinder 19, feeds the air therefrom at the desired pressure into the brake pipe or other receiver.

It will be noted that the tension of the spring 40 may be regulated by screwing the lower body 21 into or out of the lower end of the body portion 18, and that a lock nut 45 is used to hold the parts adjusted.

With the springs properly adjusted the action of the device is as follows. As long as the proper pressure is maintained in the brake pipe the piston 22 remains in its lowermost position and the valve 30 remains on its seat and prevents communication from above this valve to the cylinder 19. Upon a reduction of the pressure in the brake pipe, the pressure on top of the piston 22 will be reduced, and the spring 40 will force the piston upwardly. As the piston moves upwardly the valve 30 will be lifted off its seat, and its shouldered portion will engage the lower end of the sleeve 32 and likewise lift the valve 33. Thereupon air under high pressure from the supply tank or main reservoir will enter through the port 43, flow past the valves 33 and 30 into the chamber or recess 28 and from there will pass through the ports 29 into the upper end of the cylinder and flow through the port 44 to restore the pressure in the brake pipe.

When the pressure of the brake pipe or other receiver has been restored, the piston 22 will be forced downwardly, and spring 36 will close the valve 30, thus leaving the valve 33 free to be closed by its spring 37. It will be obvious that, by properly adjusting the spring 40, the valve 30 will close when the pressure in the chamber 14 has reached the value predetermined by the said adjustment of spring 40.

Due to the comparatively large area of the chamber 14 and the piston 22, and due to the double valving obtained by the members 30 and 33, which are respectively restrained by the springs 37 and 38, the operation of this valve is sensitive to slight pressure differences between the chambers 14 and 16. This accurate control of the air being fed is of prime importance when the pressure in a receiver or train line must be maintained at a predetermined value.

What I claim is:

1. In a valve of the class described, a body having a cylinder chamber formed therein, a piston in said chamber, said body having an exhaust port leading from said chamber above said piston, said body having an upper chamber above the first and provided with an inlet port, said body having a passage affording communication between said chambers, a plug fitted in the lower end of said passage and having a recess extending downwardly from its upper end, said plug having ports extending downwardly from the recess to communicate with the lower chamber, a stem extending upwardly from the piston through the recess, a valve on said stem normally closing the upper end of said recess, said valve having its upper end reduced to form a shoulder, a sleeve fitting slidably on said upper end and provided with a valve at its upper end for closing the upper end of said passage, said sleeve being engageable by the shoulder to lift the last mentioned valve upon the opening of the first valve, a spring associated with said stem and tending to maintain the valve which is carried by the stem in position of closure, and a second spring which is associated with said sleeve tending to maintain the sleeve in its valve-closing position.

2. In a valve of the class described, a body having a cylinder chamber formed therein, a piston in said chamber, said body having an exhaust port leading from said chamber, said body having an upper chamber above the first-mentioned chamber, which upper chamber is provided with an inlet port, a passage affording communication between said chambers, a valve seat provided adjacent each end of said passage, a valve stem extending upwardly from said piston through said passage, a valve on said stem to close the valve seat at one end of said passage, said valve in structure including a cylindrical portion and a shoulder, a sleeve slidable on said cylindrical portion, which sleeve is provided with a valve to fit the seat at the other end of said passage, the shoulder on the first-mentioned valve being adapted upon the opening of such valve to bear against said sleeve and effect the opening of the valve with which said sleeve is provided, said valve stem extending upward in said sleeve and being of smaller diameter than the bore of the sleeve, a spring surrounding the stem and tending to maintain the valve which is carried by the stem in position of closure, and a second spring which is associated with said sleeve tending to maintain the sleeve in its valve-closing position.

3. The structure of the next preceding claim, together with a recessed cap secured in threaded engagement with the upper portion of the valve body, which recessed cap includes a cylindrical portion extending downwardly into said sleeve.

In witness whereof, I hereunto set my hand.

ALEXANDER W. NICHOLSON.